A. WILBUR.
Ice-Houses.

No. 144,720.  Patented Nov. 18, 1873.

Witnesses.  Inventor.
Per
Attorneys.

UNITED STATES PATENT OFFICE.

ALFRED WILBUR, OF CEDAR CITY, MISSOURI.

IMPROVEMENT IN ICE-HOUSES.

Specification forming part of Letters Patent No. 144,720, dated November 18, 1873; application filed September 27, 1873.

*To all whom it may concern:*

Be it known that I, ALFRED WILBUR, of Cedar City, in the county of Callaway and State of Missouri, have invented a new and useful Improvement in Ice-Houses, of which the following is a specification:

The object of this invention is to improve the construction of ice-houses, by providing means for saving the water of the melted ice. My invention relates to the arrangement beneath the ice-floor of a drip-receiving chamber, which is divided into separate tanks or reservoirs, provided with spigots to deliver their contents, as hereinafter described.

Figure 1:
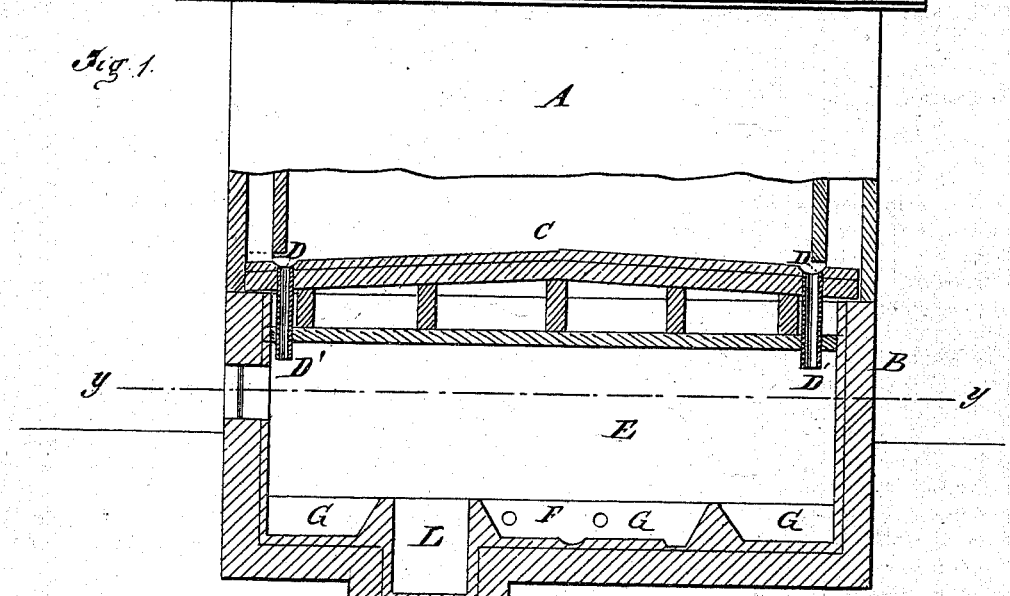
Figure 2:
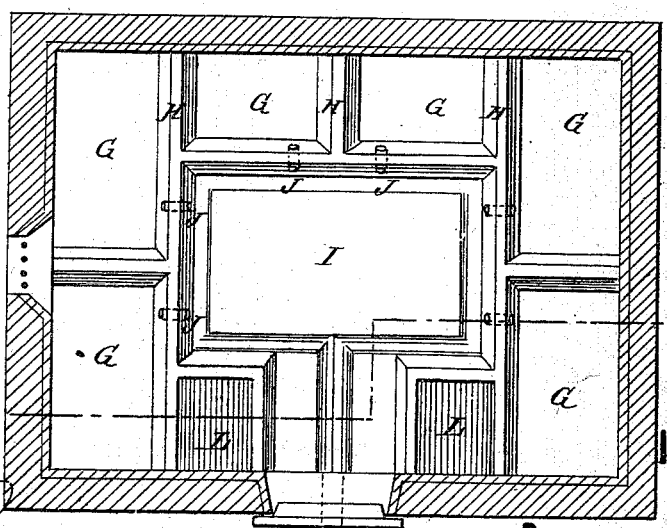

In the accompanying drawing, Figure 1 is a sectional side elevation, the section being taken on the line $x$ $x$ of Fig. 2. Fig. 2 is a horizontal section looking down from the line $y$ $y$ of Fig. 1.

Similar letters of reference indicate corresponding parts.

A is the main body of the ice-house, which is made double-walled and filled with sawdust or other non-conducting material, in the usual manner. B is the basement. C is the ice-house floor, which is elevated in the middle, so that the water will readily escape and reach the channel D, which surrounds the interior. At each angle of this channel a tube, D', is fixed, which conducts the water into the chamber E. F is the floor of this chamber. The floor is provided with a series of basins or tanks, G, separated by walls or partitions H. I is an inner or receiving tank, into which all the other tanks discharge by means of spigots J. The water in tank is used for cooling milk and similar purposes. This floor and the walls which separate the tanks are covered with cement, or made water-proof. One or more tanks may be made deep to serve as reservoirs, as seen at L, in addition to the tanks J and central tank I. The basement is made of brick or stone, and floor F is made double, and filled with non-conducting material.

In this manner of constructing the basement, all the water of the melting ice is saved for use.

The chamber E is adapted to many purposes, and is a useful appendage to the dairy, and will serve as a refrigerator for preserving fruits, vegetables, and provisions.

Having thus described my invention, I claim as new, and desire to secure by Letters Patent—

1. The chamber E, having a floor, F, divided into tanks or water-reservoirs, substantially as shown and described.

2. The tanks or reservoirs G I L, partition-walls H, and spigots J, as and for the purposes described.

ALFRED WILBUR.

Witnesses:
  C. H. REED,
  SWAN E. SAMUEL.